(12) United States Patent
Wiggers et al.

(10) Patent No.: US 11,182,220 B2
(45) Date of Patent: Nov. 23, 2021

(54) PROACTIVE HIGH AVAILABILITY IN A VIRTUALIZED COMPUTER SYSTEM

(71) Applicant: VMware, Inc., Palo Alto, CA (US)

(72) Inventors: Maarten Wiggers, Mountain View, CA (US); Manoj Krishnan, Palo Alto, CA (US); Anil Kapur, Belmont, CA (US); Keith Farkas, San Carlos, CA (US); Anne Holler, Los Altos, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/549,032

(22) Filed: Aug. 23, 2019

(65) Prior Publication Data

US 2019/0384648 A1 Dec. 19, 2019

Related U.S. Application Data

(63) Continuation of application No. 14/751,856, filed on Jun. 26, 2015, now Pat. No. 10,430,248.

(60) Provisional application No. 62/149,217, filed on Apr. 17, 2015.

(51) Int. Cl.
| | |
|---|---|
| *G06F 9/50* | (2006.01) |
| *G06F 11/30* | (2006.01) |
| *G06F 11/34* | (2006.01) |
| *G06F 9/48* | (2006.01) |

(52) U.S. Cl.
CPC .......... *G06F 9/5077* (2013.01); *G06F 9/4856* (2013.01); *G06F 11/301* (2013.01); *G06F 11/3409* (2013.01); *G06F 11/3072* (2013.01); *G06F 11/3089* (2013.01)

(58) Field of Classification Search
None
See application file for complete search history.

(56) References Cited

U.S. PATENT DOCUMENTS

| | | | |
|---|---|---|---|
| 2003/0033546 A1 | 2/2003 | Bresniker et al. | |
| 2006/0195715 A1* | 8/2006 | Herington | G06F 9/5077 714/4.2 |
| 2007/0079308 A1 | 4/2007 | Chiaramonte et al. | |
| 2012/0008627 A1* | 1/2012 | Chen | H04W 8/26 370/392 |
| 2012/0311576 A1 | 12/2012 | Shu et al. | |
| 2013/0166250 A1* | 6/2013 | Vijaykumar | G06F 11/3062 702/182 |
| 2013/0332705 A1 | 12/2013 | Martinez et al. | |
| 2014/0019966 A1* | 1/2014 | Neuse | G06F 9/45533 718/1 |

(Continued)

*Primary Examiner* — Chat C Do
*Assistant Examiner* — William C Wood
(74) *Attorney, Agent, or Firm* — Thomas Horstemeyer, LLP

(57) ABSTRACT

Disclosed are aspects of proactive high availability that proactively identify and predict hardware failure scenarios and migrate virtual resources to healthy hardware resources. In some aspects, a mapping that maps virtual resources to hardware resources. A plurality of hardware events are identified in association with a hardware resource. A hardware failure scenario is predicted based on a health score of a first hardware resource. A health score is determined based on the hardware events, and a fault model that indicates a level of severity of the hardware events. A particular virtual resource is migrated from the hardware resource to another hardware that has a greater health score.

20 Claims, 4 Drawing Sheets

(56) References Cited

U.S. PATENT DOCUMENTS

| | | |
|---|---|---|
| 2014/0280899 A1 | 9/2014 | Brewster et al. |
| 2014/0337496 A1 | 11/2014 | Ramachandran et al. |
| 2014/0337925 A1 | 11/2014 | Marshall et al. |
| 2014/0359607 A1* | 12/2014 | Tsirkin ................ G06F 9/45533 718/1 |
| 2015/0082313 A1* | 3/2015 | Aharonov ........... G06F 11/3636 718/102 |
| 2015/0120931 A1 | 4/2015 | Padala et al. |
| 2015/0169366 A1* | 6/2015 | Billore ................ G06F 9/5083 718/103 |

\* cited by examiner

PROACTIVE HIGH AVAILABILITY IN A VIRTUALIZED COMPUTER SYSTEM

CROSS-REFERENCE TO RELATED APPLICATIONS

This application is a continuation of, and claims priority to, U.S. patent application Ser. No. 14/751,856, filed on Jun. 26, 2015; this application also claims priority to U.S. Provisional Patent Application Ser. No. 62/149,217, filed Apr. 17, 2015, all of which are incorporated by reference herein in their entireties.

BACKGROUND

Software running in a datacenter increasingly performs business critical application, and such software is increasingly run on virtual machines (VMs). Hardware failure is one of the main failures that cause downtime in the datacenter. For example, if a host fails, the VMs running on the host will also fail and the software running on the VMs will be unavailable. Some hypervisors support high-availability (HA) features that react to failures by failing over VMs to healthy hosts. However, until the failover process completes, the software applications running on the VMs are unavailable. Moreover, hardware failures typically result in loss of in-memory state. As such, even with HA, hardware failures can still have a performance impact in the datacenter.

SUMMARY

Techniques for proactive high-availability (HA) in a virtualized computer system are described. In an embodiment, such techniques are implemented by a method of managing virtual resources executing on a hardware platform that include health monitoring sensors for the different hardware resources of the hardware platform. The method includes filtering sensor data from the hardware platform and combining the sensor data with a fault model for the hardware platform to generate a health score. The method further includes receiving an inventory that maps the virtual resources to hardware resources of the hardware platform. The method further includes receiving resource usage data describing use of the hardware resources of the hardware platform by the virtual resources and generating resource utilization metrics from the resource usage data. The method further includes receiving policy data specifying rules applicable to the inventory, determining, by a scheduler executing on a computing system, a set of recommendations for changes to the inventory based on the health score, the resource usage data, and the policy data, and executing, by the scheduler, at least one recommendation in the set of recommendations to implement the changes to the inventory.

Further embodiments include a non-transitory computer-readable storage medium comprising instructions that cause a computer system to carry out the above method above, as well as a computer system configured to carry out the above method.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Reference throughout this specification to "one embodiment," "an embodiment," or similar language means that a particular feature, structure, or characteristic described in connection with the indicated embodiment is included in at least one embodiment of the disclosure. Thus, the phrases "in one embodiment," "in an embodiment," and similar language throughout this specification may, but do not necessarily, all refer to the same embodiment.

Techniques for proactive high-availability (HA) in a virtualized computer system are described. Currently, hypervisors with HA react to failures by failing over VMs after detecting host failure, which involves some downtime of the VMs and applications running thereon. The objective of proactive HA is to proactively identify and predict hardware failure scenarios and migrate the affected VMs to healthy host(s) without incurring downtime. Proactive HA can ensure that VMs run on hosts that have the lowest risk of catastrophic failure (e.g., hosts that have the best health). Host health assessment is affected by component failures (e.g., loss of redundancy) on the host. Proactive HA can operate based on these health assessments and reacts by evacuating VMs to healthier hosts. Proactive HA also allows for specification of different evacuation policies, which can take into account host health severity, current cluster utilization, VM importance, business rules, failed component type, failed host information, vender recommendations, and the like. In addition, proactive HA can be configured to bring the host into a state suitable for maintenance such that an administrator can be assure that the maintenance will not affect critical business software.

Figure 1:
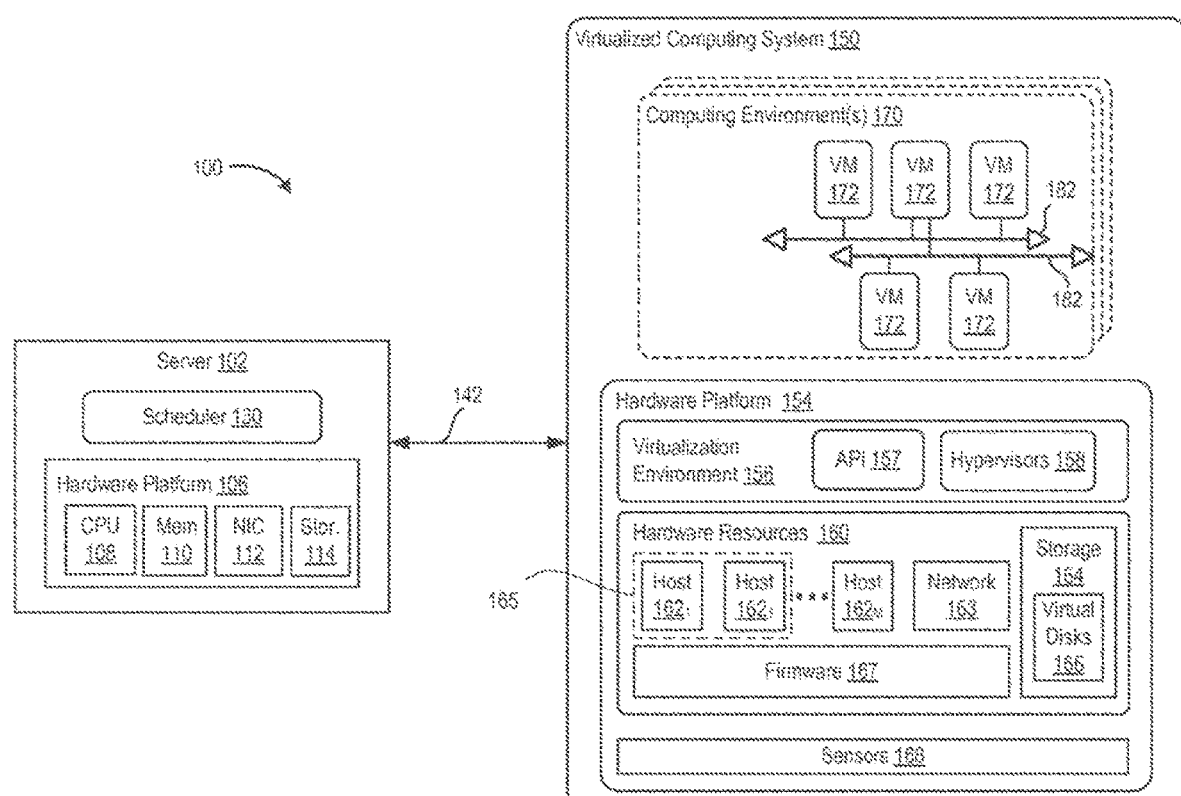
FIG. 1 is a block diagram of a computing environment in which one or more embodiments of the present disclosure may be utilized.

FIG. 1 is a block diagram of a computing environment 100 in which one or more embodiments of the present disclosure may be utilized. Computing environment 100 includes a server 102 coupled to a virtualized computing system 150. Virtualized computing system 150 is configured to provide a common platform for managing and executing virtual workloads. In an embodiment, virtualized computing system 150 may be a data center controlled and administrated by a particular enterprise or business organization, a cloud computing system operated by a cloud computing service provider, and the like.

Server 102 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). Processor 108 is configured to execute instructions, for example, executable instructions that perform one or more operations described herein and may be stored in memory 110 and in local storage. In particular, process 108 executes scheduler 130 having functions described herein. Memory 110 is a device allowing information, such as executable instructions and associated data to be stored and retrieved. Memory 110 may include, for example, one or more random access memory (RAM) modules. Network interface 112 enables server 102 to communicate with another device via a communication medium, such as virtualized computing system 150. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables server 102 to communicate with one or more network data storage systems. Examples of a storage interface are a host bus adapter (HBA) that couples server 102 to one or more storage arrays, such as a storage area network (SAN) or a network-attached storage (NAS), as well as other network data storage systems. In an embodiment, server 102 scheduler 130 runs on top of hardware platform 106 within an operating system. In another embodiment, server 102 can include a virtualization environment running on top of hardware platform 106, and scheduler 130 can run within a virtual machine (VM) executing in the virtualization environment.

In one or more embodiments, virtualized computing system 150 is configured to dynamically provide an enterprise (or users of an enterprise) with one or more computing environments 170 in which a user may provision VMs 172, deploy multi-tier applications on VMs 172, and/or execute workloads. Virtualized computing system 150 includes a hardware platform 154 upon which each computing environment 170 may be executed. In the particular embodiment of FIG. 1, hardware platform 154 includes hardware resources 160 having computing resources (e.g., hosts 162 1 to 162 N), storage resources 164 (e.g., one or more storage array systems, such as SAN), firmware resources 167, and networking resources 163, which are configured in a manner to provide a virtualization environment 156 that supports the execution of a plurality of virtual machines 172 across hosts 162. Firmware resources 167 can be part of any of hosts 162, network resources 163, and storage resources 164. It is recognized that hardware resources 160 of virtualized computing system 150 may in fact be distributed across multiple data centers in different locations. Hardware resources 160 can be aggregated with varying granularity. For example, host 162 is a hardware resource that comprises a collection of CPU, memory, network, and storage resources. A cluster of hosts (host cluster 165) is a hardware resource that comprises a collection of hosts.

Hardware platform 154 can also include various sensors 168 configured to monitor hardware resources 160. Sensors 168 can collect various types of sensor data from hosts 162, network resources 163, storage 164, some of which are described below. Sensors 168 can collect data from hardware, firmware, software, or a combination thereof.

Virtualization environment 156 can include hypervisors 158 configured to virtualize hardware resources 160 to provide virtual resources, such as VMs, virtual disks, virtual networks, and the like. Virtualization environment 156 can maintain an inventory of virtual resources. The inventory can include a mapping of virtual resources to hardware resources. Virtualization environment can include hypervisors 158. Hypervisors 158 provide a virtualization layer that abstracts processor, memory, storage, and networking resources of hardware platform 154 into multiple virtual machines 172 that run concurrently on hosts 162. Hypervisors 158 may run on top of the operating system of host 104, nested within other hypervisors, or directly on hardware components of host 104. For example, hypervisors 158 can be VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

Hypervisors 158 can virtualize network resources 163 to provide one or more virtual networks 182 used to communicate between VMs 172. Hypervisors 158 can virtualize storage 164 to provide virtual disks 166 for VMs 172. In general, the term "virtual resources" as used herein is meant to encompass virtual computing instances, VMs, virtual disks, virtual networks, and the like provided through virtualization of hardware resources using virtualization software, such as hypervisors. Virtual computing instances include VMs and other types of virtual contexts, such as containers not including a guest operating system, referred to herein as "OS-less containers." As such, while VMs 172 are shown in the example of FIG. 1, computing environment(s) 170 can generally include a plurality of virtual computing instances, such as VMs, OS-less containers, and the like.

Virtualization environment 156 can include an application programming interface (API) 157. Server 102 can use API 157 to communicate with virtualization environment 156. For example, API 157 can be a REST (Representational State Transfer) API or any other client-server communication protocol.

Scheduler 130 is configured to manage virtual resources executing on hardware platform 154 (e.g., VMs 172, virtual networks 182, virtual disks 166). Scheduler 130 can implement proactive high-availability (HA) to ensure that virtual resources execute on hardware resources that have a low risk of failure, i.e., hardware resources having good health, rather than hardware resources having poor health. Scheduler 130 generates a set of recommendations for changes to the inventory of virtualization environment 156 based on input described below. The inventory includes a mapping of virtual resources to hardware resources in computing system 150 (e.g., which VMs 172 run on which hosts 162, which virtual networks 182 are implemented on which network resources 163, and which virtual disks 166 are stored on which storage resources 164). Scheduler 130 can obtain the inventory from virtualization environment 156 (e.g., through API 157). A recommended change to the inventory can include evacuation of a virtual resource from one hardware resource (e.g., a hardware resource having poor health) to another hardware resource (e.g., a hardware resource having good health). In another example, a recommended change can be restarting a VM on its current host or on a different host. Input to the scheduler 130 can include hardware resource health state, hardware resource utilization, and policy data, each of which is discussed below.

Figure 2:
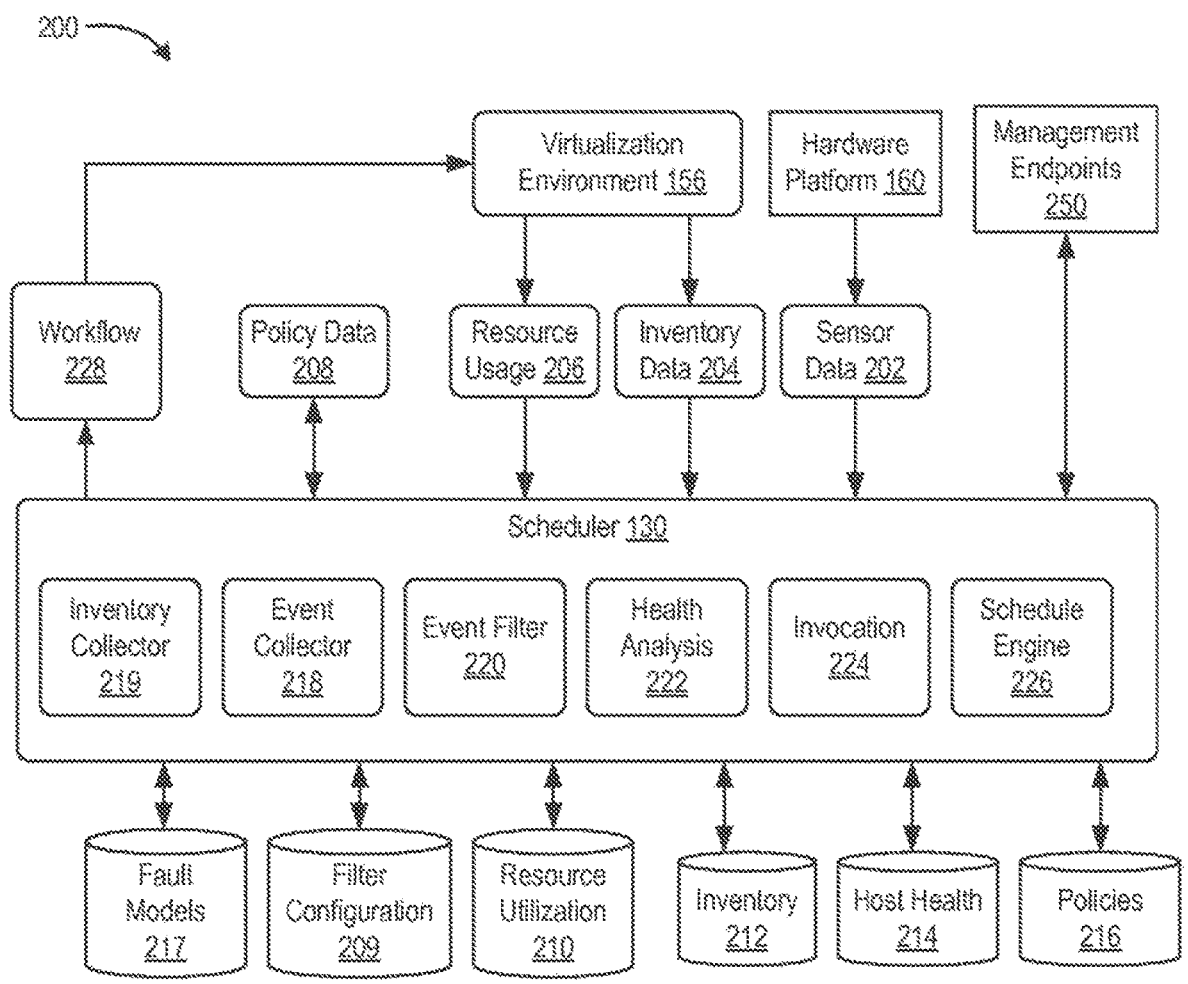
FIG. 2 is block diagram depicting operation of a scheduler in a proactive high-availability (HA) system according to an embodiment.

FIG. 2 is block diagram depicting operation of scheduler 130 in a proactive HA system according to an embodiment. Scheduler 130 includes an event collector 218, an inventory collector 219, an event filter 220, a health analysis module 222, an invocation module 224, and a schedule engine 226. Scheduler 130 maintains various databases, including filter configuration database 209, resource utilization database 210, inventory database 212, host health database 214, policy database 216, and fault model database 217. Scheduler 130 can communicate with virtualization environment 156 to obtain resource usage data 206 and inventory data 204. Scheduler 130 can communicate with hardware platform 160 to obtain sensor data 202. Scheduler 130 can communicate with virtualization environment 156 to provide evacuation workflows 228.

Scheduler 130 communicates with hardware platform 160 to obtain sensor data 202. Each of sensors 168 (shown in FIG. 1) monitors one or more hardware resources of hardware platform 160. Sensors 168 can include hardware-based sensors (e.g., a temperature monitor) and/or software-based sensors (e.g., application-level monitors). For example, sensor data 202 can include the up/down state of storage devices, the up/down state of a network interfaces, error correcting code (ECC) errors from the memory, fan revolutions per minute (RPM) values, power supply voltages/currents, CPU temperatures, chassis temperatures, and the like known in the art. Sensor data 202 can also include data indicative of firmware failures of one or more hardware resources. For example, a fault in firmware of a network interface controller (NIC) can prevent packets from traversing the NIC, but the hardware of the NIC may be fully functional. Sensors 168 can include software that monitors for such firmware failures. In the example above, application-level monitoring can be used to detect the fault in the NIC firmware (e.g., pinging the NIC). Event collector 218 aggregates and collects sensor data 202 from the various sensors in hardware platform 160 and outputs events. An event can be a change in monitored state of hardware resource(s). For example, an event can be a change in CPU temperature, a change in the up/down state of a storage device, a change in power supply voltage/current, a change in RPM of a fan, or the like.

Event filter 220 filters out events that are not relevant for the determination of a health score for a given hardware resource. In an embodiment, event filter 220 applies thresholds to particular types of events. For example, event filter 220 can filter out temperature events that do not satisfy a particular temperature threshold. In another example, event filter 220 can filter out ECC events that do not exceed a particular number of ECC events within a particular time period. In another embodiment, event filter 220 filters events based on relevancy. Event filter 220 can filter out events that are not relevant for how software uses a particular hardware resource. For example, event filter 220 can filter out an event indicating that a particular local storage device of a host is down because software executing on that host does not use the local storage device. That various thresholds, relevancy information, and the like can be stored in filter configuration database 209.

Health analysis module 222 determines health scores for hardware resources in hardware platform 160. Health analysis module 222 can compute the health scores by applying weights to the filtered events based on fault models 217 for the hardware resources. Fault models 217 can specify a level of severity for particular types of faults or combinations of faults. For example, a single fan failure in a host can be considered a minor fault, whereas multiple fan failures in combination with a rise in chassis temperature can be considered a major fault. Another example includes an assessment of remaining redundancy. For example, failure of a single power supply in a host having four healthy power supplies can be considered a minor fault, whereas the failure of a single power supply in a host having only one remaining healthy power supply can be considered a major fault. Some hardware resources can be critical enough to be considered individually. For example, a large number of ECC memory errors can itself be considered a major fault. In general, various fault models can be established for different types of hardware resources in hardware platform 160 and the filtered events can be weighted based on the severity of the indicated fault. Fault models can be stored in fault model database 217.

Health analysis module 222 can combine the weighted events to generate a health score associated with a hardware resource, such as a host, a storage device, a network, device, or the like. Health analysis module 222 can compute health scores with varying granularity. For example, health analysis module 222 can aggregate events associated with a particular host and compute a health score for that host based on only events generated by that host. In another example, health analysis module 222 can aggregate events for a cluster of hosts and compute a health score for that host cluster based on the cluster-wide events.

Health analysis module 222 can maintain scores of various hardware resources of hardware platform 160 in host health database 214. Host health database 214 can also store recommended actions associated with health scores. For example, a recommended action can be replacement of a hardware component. A recommended action can be to monitor the hardware component. A recommended action can include information about the hardware component, such as whether the hardware component is hot-swappable. A recommended action can indicate that a hot-swappable component can be replaced while the host is powered on. As discussed below, invocation module 224 can monitor health scores in host health database 214 to invoke schedule engine 226. Schedule engine 226 can obtain recommended actions from host health database 214.

Inventory collector 219 obtains inventory data 204 and resource usage data 206 from virtualization environment 156. Inventory data 204 can include a mapping of virtual resources to hardware resources. Inventory data 204 can include status information, such as which virtual resources are powered on, powered off, suspended, etc. Inventory data 204 can specify which hosts are part of a given host cluster. Inventory data 204 can specify which VMs are assigned to which hosts. Inventory collector 219 can store inventory data 204 in inventory database 212. Resource usage data 206 specifies current resource usage by the virtual resources in hardware platform 160. Inventory collector 219 can generate various resource utilization metrics from resource usage data 206, such as CPU, memory, storage, and network utilization metrics. Inventory collector 219 can store the resource utilization metrics in resource utilization database 210.

Scheduler 130 can also obtain policy data 208. Policy data 208 specifies rules applicable to the inventory of virtualization environment 156. The rules can include metrics that specify the criticality of VM-to-host affinity or anti-affinity, VM-to-VM affinity or anti-affinity, the correct operation of virtual devices in a VM, VM performance, VM availability, and the like. Policy data 208 can describe relationship(s) between the rules, such as how the rules should be weighed against one another. For example, an administrator can specify which host health severities are allowed to violate which levels of criticality of the rules. For example, a particularly severe host health state might be a valid reason to migrate a VM to another host despite the fact that not all virtual devices on the destination host are available and that the VM will operate in a degraded state on the destination host. Scheduler 130 can store policy data 208 in policy database 216.

Invocation module 224 invokes schedule engine 226 in response to various triggers. Invocation module 224 can monitor health database 214 for changes in health scores for hardware resources. Invocation module 224 can invoke schedule engine 226 in response to a threshold change in a health score for a given hardware resource. Invocation module 224 can invoke schedule engine 226 in response to a change in the inventory in inventory database 212. Invocation module 224 can invoke schedule engine 226 in response to a change in a policy in policy database 216. Invocation module 224 can invoke schedule engine 226 in response to a change in resource utilization in resource utilization database 210.

Schedule engine 226 determines a set of recommendations for changes to the inventory based on health scores, resource utilization, and policy data. The health scores describe risk factors for availability of hardware resources. Resource utilization describes performance metrics for the hardware resources. The policy data describe preferences for classes of schedules and rules on how to weigh availability, performance, and schedule preferences. Schedule engine 226 can generate recommendation(s) in response to being invoked by invocation module 224. Schedule engine 226 can obtain health scores from host health database 214, resource utilization metrics from resource utilization database 210, policies from policy database 216, and inventory from inventory database 212. A recommendation can include a proposed evacuation of a virtual resource from one hardware resource to another hardware resource. For example, a recommendation can include a proposed evacuation of a VM from one host to another host.

Schedule engine 226 executes the recommendations upon approval. In an embodiment, schedule engine 226 elicits approval by outputting the recommendations for review by an administrator. For example, schedule engine 226 can output recommendations to one or more management endpoints 250 (e.g., computing devices used by administrators). Schedule engine 226 can receive approval or non-approval in responses to the recommendations (e.g., from management endpoints 250). In some embodiments, schedule engine 226 can enable automatic approval of certain classes of recommendations. For example, evacuation of VMs from a host that is causing an availability risk can be time-critical and could be configured to be automatically approved. In contrast, bringing a host back online after maintenance is less critical and can involve manual verification by an administrator that the host is in a healthy state. Such a recommendation can be configured to require explicit approval from an administrator.

Approved recommendations trigger schedule engine 226 to execute a workflow 228 that causes the required changes in the inventory. For example, a VM can be moved from one host to another host, a virtual disk can be transferred from one storage device to another storage device, a virtual network can be transitioned from one network device to another network device, and the like. In another example, a host or other hardware resource can be brought into a state suitable for maintenance. In another example, a VM can be restarted on its current host or a different host. In some cases, a workflow 228 may not successfully complete. In such cases, schedule engine 226 can output an alert (e.g., to management endpoints 250) and re-invoke the scheduling process to remediate the resulting state. When a host is brought into a state suitable for maintenance, schedule engine 226 can output an alert to an administrator (e.g., via management endpoints 250).

In some cases, an administrator may not approve a particular recommendation. For example, the recommendation can be based on an event that the administrator knows to be a false alarm. Based on feedback from the administrator, schedule engine 226 can update one or more of the filter configuration for event filter 220 or policies in the policy database 216. Updating the filter configuration in filter configuration database 209 will cause an update to the filtered event and the health score(s) in host health database 214. Updating the policies in policy database 216 can modify the weights applied to the different inputs to schedule engine 226. Updates to the filter configuration and/or policies can trigger the schedule engine 226 to be re-invoked.

Figure 3:
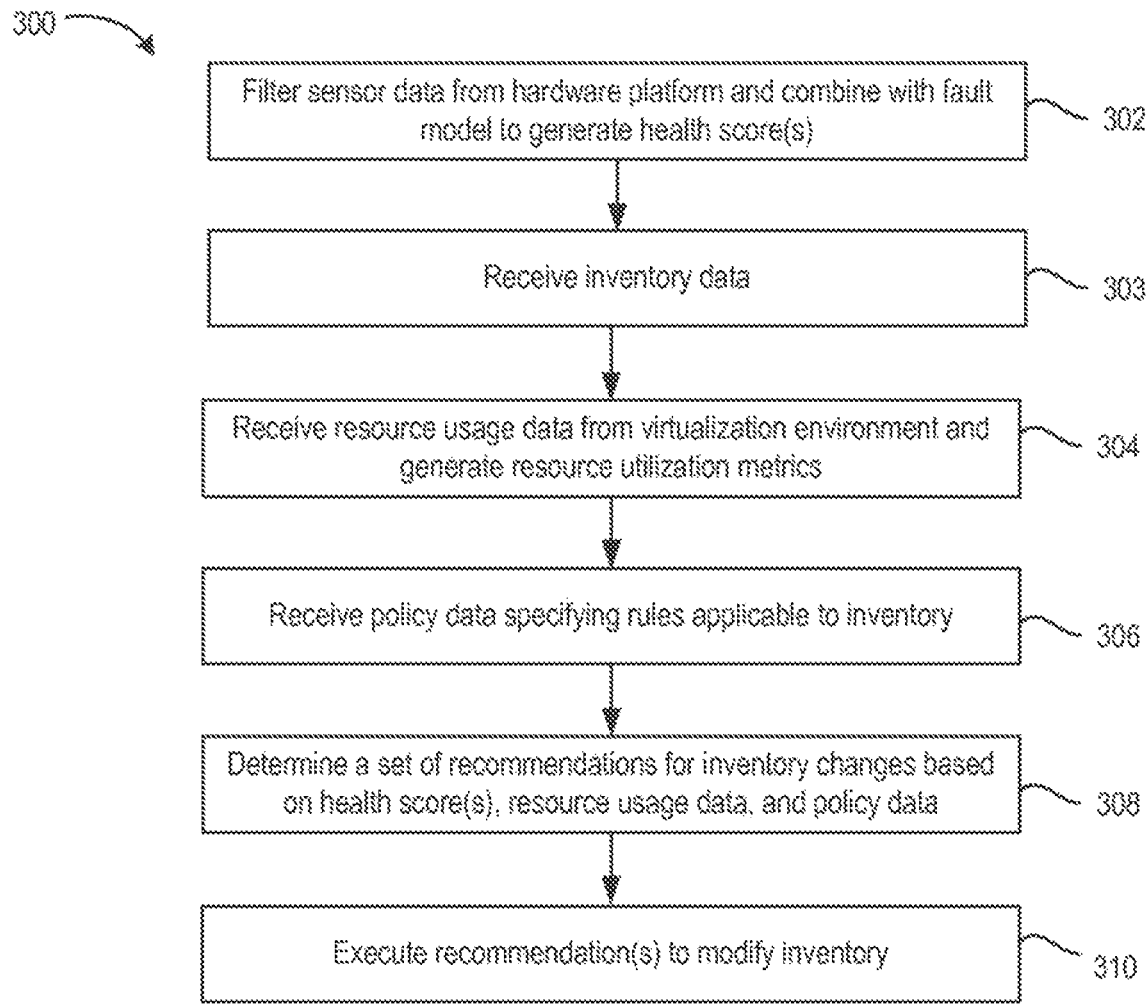
FIG. 3 is a flow diagram depicting a method of managing virtual resources executing on a hardware platform according to an embodiment.

FIG. 3 is a flow diagram depicting a method 300 of managing virtual resources executing on a hardware platform according to an embodiment. Method 300 can be performed by scheduler 130 executing on a computing platform, such as server 102. Method 300 begins at step 302, where scheduler 130 filters sensor data from hardware platform 154 and combines the sensor data with fault models to generate health scores. At step 303, scheduler 130 receives inventory data from virtualization environment 156. At step 304, scheduler 130 receives resource usage data from virtualization environment 156 and generates resource utilization metrics. At step 306, scheduler 130 receives policy data specifying rules applicable to the inventory. The health scores, resource utilization metrics, and policy data are described in detail above.

At step 308, scheduler 130 determines a set of recommendations for inventory changes based on the health score(s), resource usage data, and policy data. At step 310, scheduler 130 executes recommendation(s) to modify the inventory. Recommendations and execution thereof are discussed in detail above.

Figure 4:
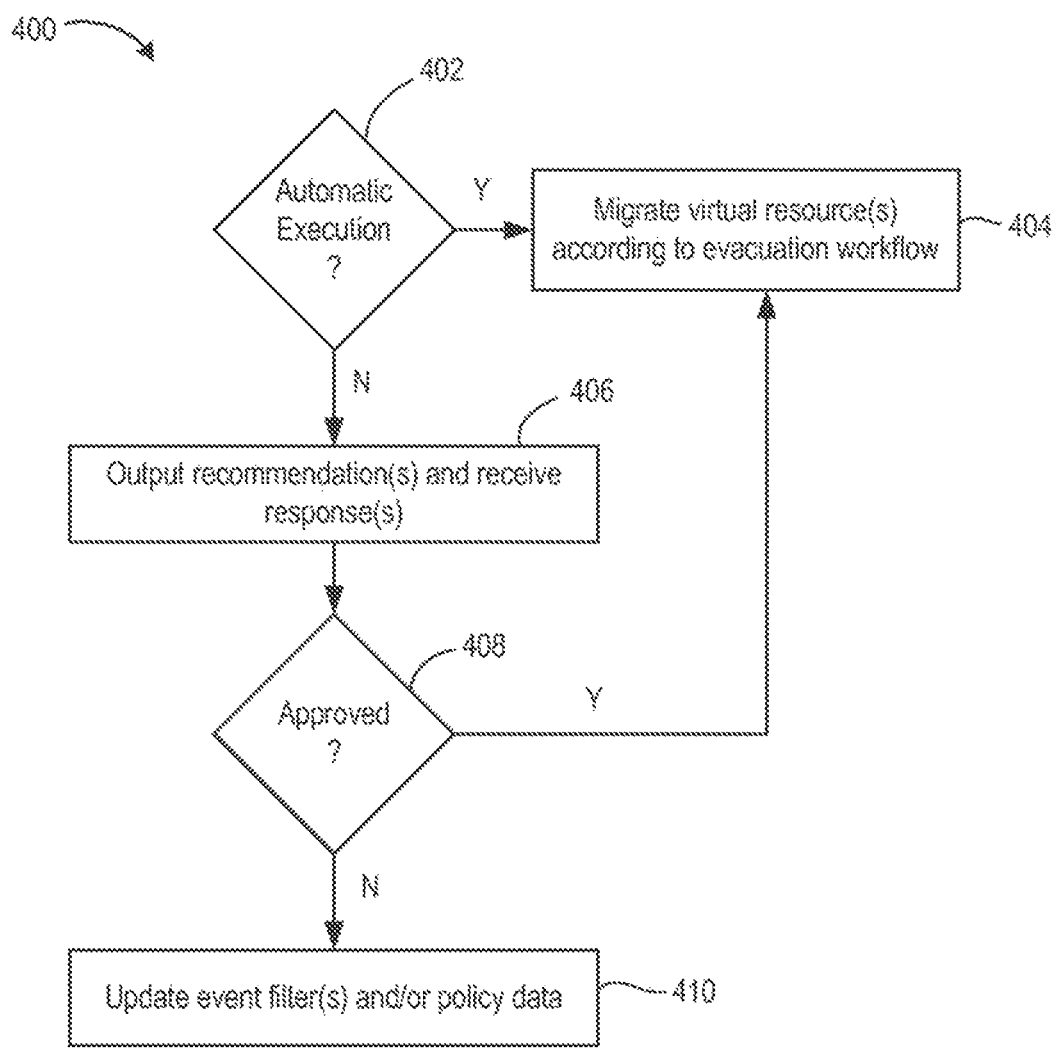
FIG. 4 is a flow diagram depicting a method of executing a recommendation according to an embodiment.

FIG. 4 is a flow diagram depicting a method 400 of executing a recommendation according to an embodiment. Method 400 can be performed by scheduler 130 executing on a computing platform, such as server 102. Method 400 begins at step 402, where scheduler 130 determines whether the recommendation should be automatically executed. If so, method 400 proceeds to step 404, where scheduler 130 executes a workflow for the recommendation. For example, scheduler 130 can execute a workflow to migrate a virtual resource from one hardware resource to another hardware resource. If at step 402 the recommendation requires explicit approval, method 400 proceeds to step 406.

At step 406, scheduler 130 outputs the recommendation and receives a response from an administrator. At step 408, scheduler 130 determines whether the recommendation is approved. If so, method 400 proceeds to step 404 described above. Otherwise, method 400 proceeds to step 410, where scheduler 130 updates event filter(s) and/or policy data. Scheduler 130 can then re-invoke method 300 and method 400 based on the updated event filter(s) and/or policy data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtual computing instance" as used herein is meant to encompass both VMs and OS-less containers.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

Therefore, the following is claimed:

1. A method, comprising:
   receiving, by executable instructions comprising a virtual resource scheduler, policy data for an inventory of virtual resources and hardware resources of at least one hardware platform;
   identifying, by the virtual resource scheduler, a plurality of hardware events associated
with a first hardware resource of the at least one hardware platform;
   filtering out, by the virtual resource scheduler, at least one hardware event of the plurality of hardware events for the first hardware resource based on the at least one hardware event corresponding to hardware that is unutilized by software of a virtual resource executed using the at least one hardware platform, wherein the virtual resource is a virtual machine, a virtual disk, a virtual network, or a virtual compute instance;
   predicting, by the virtual resource scheduler, a hardware failure scenario based on a health score of the first hardware resource, the health score being determined based on a subset of the plurality of hardware events that excludes the at least one hardware event corresponding to hardware that is unutilized by the software of the virtual resource, and a fault model that indicates a level of severity of the hardware failure scenario based at least in part on at least one of the plurality of hardware events;

determining, by the virtual resource scheduler, that executing the virtual resource on a second hardware resource will result in a degraded operation state of the virtual resource on the second hardware resource; and migrating, by the virtual resource scheduler, the virtual resource from the first hardware resource to the second hardware resource based at least in part on the policy data indicating that the degraded operation state of the virtual resource on the second hardware resource is acceptable in comparison to the level of severity of the predicted hardware failure scenario.

2. The method of claim 1, wherein the plurality of hardware events comprise at least one firmware event for the first hardware resource of the at least one hardware platform.

3. The method of claim 1, further comprising: receiving, by the virtual resource scheduler, utilization metrics indicating that the hardware is unutilized by software of the virtual resource.

4. The method of claim 1, further comprising: receiving, by the virtual resource scheduler, a virtual resource to virtual resource affinity rule associated with the virtual resource.

5. The method of claim 1, wherein the policy data describes at least one relationship between a first rule associated with the hardware failure scenario and a second rule associated with the degraded operation state.

6. The method of claim 1, wherein the hardware failure scenario is predicted based on a threshold change in the health score of the first hardware resource.

7. The method of claim 1, wherein the plurality of hardware events comprise at least one hardware event for the first hardware resource, wherein the at least one hardware event is identified based on a detected voltage or a detected current associated with the first hardware resource.

8. A system, comprising:
at least one computing device comprising at least one processor; and
at least one memory, the at least one memory comprising executable instructions comprising a virtual resource scheduler, wherein the instructions, when executed by the at least one processor, cause the at least one computing device to at least:
receive policy data for an inventory of virtual resources and hardware resources of at least one hardware platform;
identify a plurality of hardware events associated with a first hardware resource of the at least one hardware platform;
filter out, by the virtual resource scheduler, at least one hardware event of the plurality of hardware events for the first hardware resource based on the at least one hardware event corresponding to hardware that is unutilized by software of a virtual resource executed using the at least one hardware platform, wherein the virtual resource is a virtual machine, a virtual disk, a virtual network, or a virtual compute instance;
predict, by the virtual resource scheduler, a hardware failure scenario based on a health score of the first hardware resource, the health score being determined based on a subset of the plurality of hardware events that excludes the at least one hardware event corresponding to hardware that is unutilized by the software of the virtual resource, and a fault model that indicates a level of severity of the hardware failure scenario based at least in part on at least one of the plurality of hardware events;

determine that executing the virtual resource on a second hardware resource will result in a degraded operation state of the virtual resource on the second hardware resource; and migrate the virtual resource from the first hardware resource to the second hardware resource based at least in part on the policy data indicating that the degraded operation state of the virtual resource on the second hardware resource is acceptable in comparison to the level of severity of the predicted hardware failure scenario.

9. The system of claim 8, wherein the plurality of hardware events comprise at least one firmware event for the first hardware resource of the at least one hardware platform.

10. The system of claim 8, wherein the instructions, when executed by the at least one processor, further cause the at least one computing device to at least: receive utilization metrics indicating that the hardware is unutilized by software of the virtual resource.

11. The system of claim 8, wherein the instructions, when executed by the at least one processor, further cause the at least one computing device to at least: receive a virtual resource to virtual resource affinity rule associated with the virtual resource.

12. The system of claim 8, wherein the policy data describes at least one relationship between a first rule associated with the hardware failure scenario and a second rule associated with the degraded operation state.

13. The system of claim 8, wherein the hardware failure scenario is predicted based on a threshold change in the health score of the first hardware resource.

14. The system of claim 8, wherein the plurality of hardware events comprise at least one hardware event for the first hardware resource, wherein the at least one hardware event is identified based on a detected voltage or a detected current associated with the first hardware resource.

15. A non-transitory computer readable medium comprising executable instructions, wherein the instructions, when executed by at least one processor, cause at least one computing device to at least:
receive policy data for an inventory of virtual resources and hardware resources of at least one hardware platform;
identify a plurality of hardware events associated with a first hardware resource of the at least one hardware platform;
filter out, by a virtual resource scheduler, at least one hardware event of the plurality of hardware events for the first hardware resource based on the at least one hardware event corresponding to hardware that is unutilized by software of a virtual resource executed using the at least one hardware platform, wherein the virtual resource is a virtual machine, a virtual disk, a virtual network, or a virtual compute instance;
predict, by the virtual resource scheduler, a hardware failure scenario based on a health score of the first hardware resource, the health score being determined based on a subset of the plurality of hardware events that excludes the at least one hardware event corresponding to hardware that is unutilized by the software of the virtual resource, and a fault model that indicates a level of severity of the hardware failure scenario based at least in part on at least one of the plurality of hardware events;

determine that executing the virtual resource on a second hardware resource will result in a degraded operation state of the virtual resource on the second hardware resource; and migrate the virtual resource from the first hardware resource to the second hardware resource based at least in part on the policy data indicating that the degraded operation state of the virtual resource on the second hardware resource is acceptable in comparison to the level of severity of the predicted hardware failure scenario.

16. The non-transitory computer readable medium of claim 15, wherein the plurality of hardware events comprise at least one firmware event for the first hardware resource of the at least one hardware platform.

17. The non-transitory computer readable medium of claim 15, wherein the instructions, when executed by the at least one processor, further cause the at least one computing device to at least: receive utilization metrics indicating that the hardware is unutilized by software of the virtual resource.

18. The non-transitory computer readable medium of claim 15, wherein the instructions, when executed by the at least one processor, further cause the at least one computing device to at least: receive a virtual resource to virtual resource affinity rule associated with the virtual resource.

19. The non-transitory computer readable medium of claim 15, wherein the policy data describes at least one relationship between a first rule associated with the hardware failure scenario and a second rule associated with the degraded operation state.

20. The non-transitory computer readable medium of claim 15, wherein the policy data comprises an evacuation policy comprising an indication of importance of software of the virtual resource, and wherein the virtual resource is migrated further based on the indication of the importance of the software of the virtual resource.

* * * * *